July 19, 1960
D. Z. HUZAR
2,946,006
MOVABLE POINTER HANDS FOR MEASURING INSTRUMENTS, CHIEFLY ELECTROMETERS
Filed March 22, 1956
3 Sheets-Sheet 1
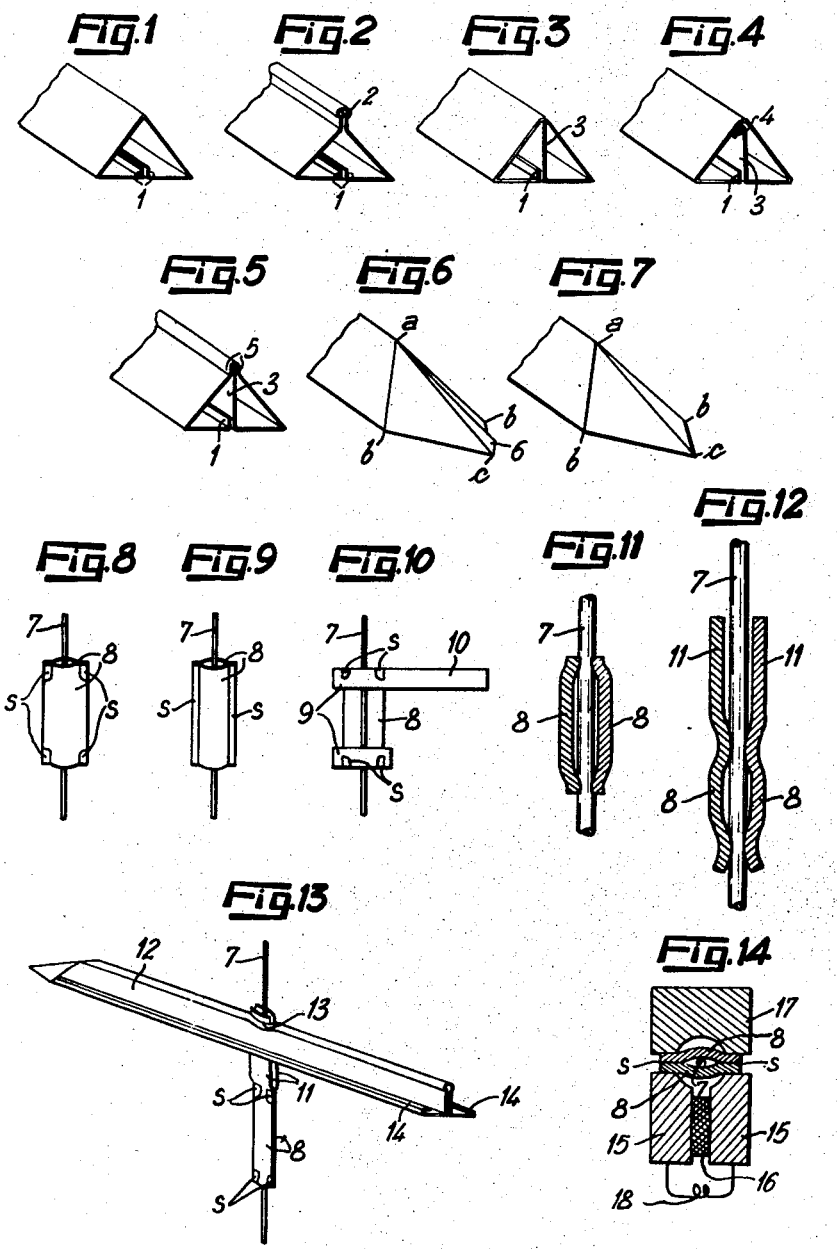
INVENTOR
DMETRO Z. HUZAR
BY Young, Emery & Thompson
ATTYS.

July 19, 1960
D. Z. HUZAR
2,946,006
MOVABLE POINTER HANDS FOR MEASURING
INSTRUMENTS, CHIEFLY ELECTROMETERS
Filed March 22, 1956
3 Sheets-Sheet 2
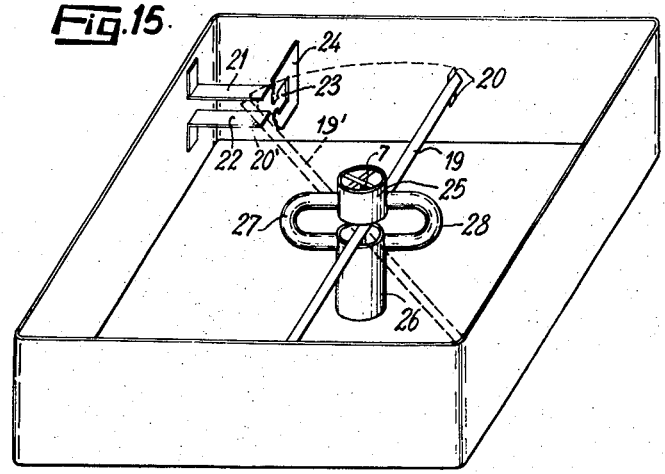
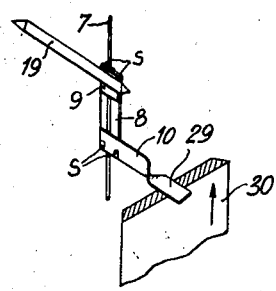
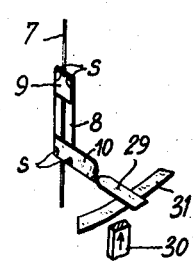
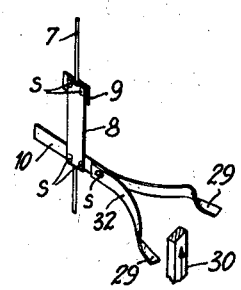
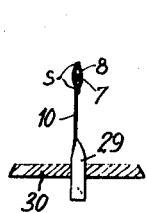
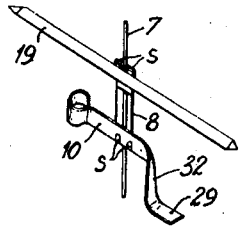
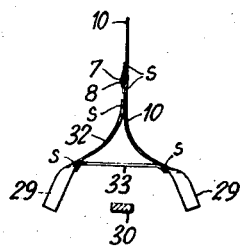
INVENTOR
DMETRO Z. HUZAR
By Young, Emery & Thompson
ATTYS.

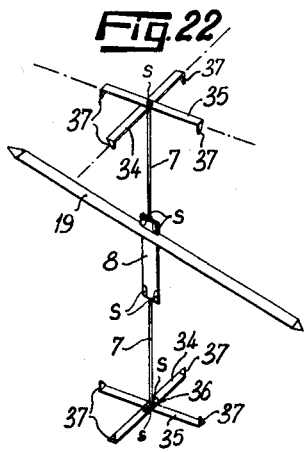
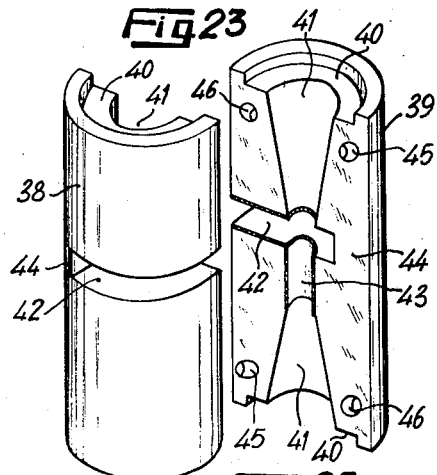
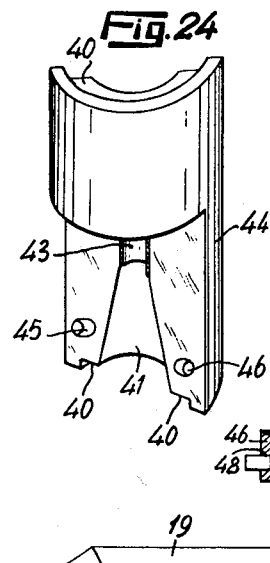
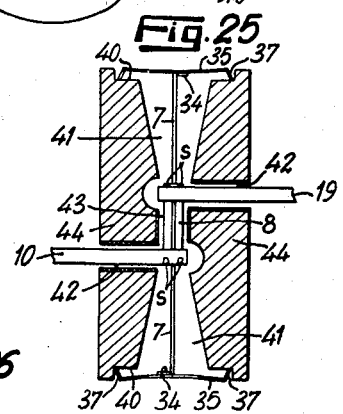
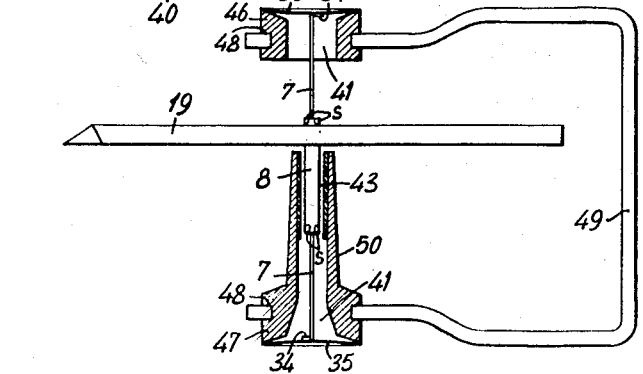

2,946,006
MOVABLE POINTER HANDS FOR MEASURING INSTRUMENTS, CHIEFLY ELECTROMETERS

Dmetro Z. Huzar, 6 Ave. Hache, L'Hay Les Roses, France

Filed Mar. 22, 1956, Ser. No. 573,265

5 Claims. (Cl. 324—154)

My invention has for its object improvements in the suspension of very light-weight indicator hands or needles and the like miniature parts to the rotary or movable element of low period electrostatic apparatus such as portable electrometers.

My invention also covers the means provided for connecting the very small sized movable hand or pointer system of an electrometer or the like torsionally-operating instrument to the wire subjected to the usual torsional forces to be measured, such as that shown and described in Figs. 9 and 10 of my French Patent No. 1,082,666 wherein the pointer of the present invention is similar to the movable portion of Fig. 10, said means furthering the mounting and the positioning of the movable pointer in said apparatus and also reducing the sensitivity of the system to the action of inertia, in the case for instance of a dropping or vibration affecting such apparatus or instruments.

As a consequence of the properties arising through the mounting of movable pointers according to my invention, numerous embodiments are more particularly suitable for a portable low price apparatus such as a pocket or portable apparatus which serve for detecting and measuring ionizing radiations.

I will now describe my invention with further details, reference being made to the accompanying drawings illustrating the features and the embodiments of my invention. In said drawings:

Figs. 1 to 5 show particularly advantageous miniature shaped members intended to form part of movable pointers.

Figs. 6 and 7 show the tips obtained through the folding of the ends of miniature shaped members.

Figs. 8 to 10 show intermediate parts for securing a miniature shaped member to a fine wire or ribbon.

Figs. 11 and 12 are detail sectional views showing the engagement of such intermediate parts over the fine wire.

Fig. 13 illustrates a complete movable pointer fitted over a torsion wire.

Fig. 14 illustrates the electrodes being subjected to resistance welds on the intermediate parts.

Fig. 15 illustrates a movable pointer serving as an electric contact maker fitted in a carrier allowing large deflections.

Figs. 16 to 21 show various movable pointers the movements of which may be detected by an auxiliary feeler.

Fig. 22 shows a movable pointer carried on a torsion wire or ribbon stretched between two springs.

Figs. 23 and 24 show carriers for the movable pointer illustrated in Fig. 22.

Lastly, Figs. 25 and 26 show two movable pointers carried by torsion wires or ribbons and fitted inside their carrier.

Referring first to Figs. 1 to 5, these figures illustrate five preferred embodiments of miniature shaped pointer members according to my invention wherein the longitudinal edges 1, 3, 4 and 5 of the strip which serves to form said members, are all positioned within the outline of the shaped member. For sake of simplicity, these edges are shown as spaced with reference to each other so as to make them more clearly apparent to the eye. For the finishing of such a miniature shaped member, these edges are secured to the surfaces parallel thereto, either through gluing or through welding whereby the miniature shaped member is reinforced. Another manner of reinforcing such members consists in extending one or both of the folded edges 1 shown in Fig. 2 so as to make them engage the opposite folds 2 inside which they may be secured.

I have illustrated in Figs. 6 and 7 two terminal sections of miniature shaped members as obtained through folding along the ridges a—b, b—c, and a—c. The tips thus formed may serve for reading a scale, the accuracy of said reading being furthered by the nose shaped point 6 on said tip in the case of Fig. 6.

Figs. 8 and 9 show how it is possible to clamp a fine wire or ribbon 7 between two small longitudinal blades 8 and 8 which are interconnected through welds as shown at s lying outside the wire or carrier member 7. In both Figs. 8 and 9, the gap between the two blades 8 and 8 enclosing the wire 7 is drawn on a highly exaggerated scale whereas in practice said gap is, in the part in register with the weld, slightly smaller than the thickness of the fine wire or ribbon 7.

Similarly, Fig. 10 shows how a fine wire or ribbon 7 may be clamped between a small longitudinal blade 8 and two transverse blades 9 and 9 as provided by the weld s between said transverse blades and the longitudinal blade 8. The extension 10 of one of the transverse blades 9 may serve various purposes of the movable pointer, of which purposes a number will be disclosed hereinafter. Thus it may serve for the equilibrium of the movable pointer, in particular if such a pointer is constituted by a miniature shaped member secured in overhanging relationship on the side of the intermediate member of Fig. 10 opposed to the extension 10. Fig. 10 being a front view, the gap between the blades 9 and the blade 8 is concealed to view.

As shown in Fig. 11 which is a longitudinal cross-section corresponding to Fig. 8 in a plane perpendicular to the blades 8, the engagement of the blades inside the wire 7 is illustrated to an exaggerated extent as also the spacing between said blades 8 and the wire 7 in the medial sections of said blades, said spacing being in practice reduced substantially to zero. It is apparent that the upper and lower edges of the blades engage the wire through their convexity.

Turning to Fig. 12 which is a cross-section similar to that of Fig. 11 with the same exaggerated parts, the two longitudinal blades 8 and 8 are provided with two extensions 11 to either side of and at a very small distance from the fine wire or ribbon 7.

In Fig. 13, a movable pointer carried by the torsional wire or ribbon 7 is constituted by an intermediate member such as that of Fig. 12, the two extensions 11 and 11 of which carry the miniature shaped member 12. To this end the latter is provided with an opening 13. Said shaped member assuming the shape of a T is characterized by the folding of the outer longitudinal edges 14—14 inwardly.

Fig. 14 is a cross-sectional view illustrating a preferred manner of obtaining accurately the desired spacing between the resistance welds s and s of the blades 8 and 8 or 8 and 9 enclosing the fine wire or ribbon 7. To this end, the two electrodes 15 and 15 to one side of the blades are separated by an insulating part 16 and over them is laid the blade arrangement 8—7—8 or 8—7—9 with member 17 placed on top of the blade arrangement. The two electrodes 15 and 15 being fed through the secondary 18 of a welding transformer, the same current passes through the two welds s—s to either side of said fine wire or ribbon 7. It will be readily ascertained that by suitably selecting the breadth of the notches formed in the electrodes it is possible to obtain a maximum clamping of the fine wire or ribbon between the blades, the value of this maximum clamping depending on the requirements of operation for a predetermined movable pointer. This accuracy in the spacing between the two welds s—s to either side of the member to be clamped is an important feature of my invention. Obviously a similar result may be obtained by resorting in a similar manner to a welding method operating through compression.

I have also illustrated in Fig. 15 a movable pointer constituted by a miniature shaped member 19 provided with a small plate 20 at one end, which plate serves for establishing an electrical contact. As a matter of fact, when the movable pointer reaches the position 19', the small plate 20 is in a position 20' between the superposed electric contact-pieces 21 and 22. In order to prevent said contact-pieces 21 and 22 from exerting an electrostatic attraction at a distance on the movable pointer 19—20; there is provided an electrostatic screen 24 with a gap 23 for the passage of said pointer through the screen. On the other hand, when the pointer 19—20 reaches a position near the gap, the attraction exerted on it by at least one of the contact-pieces 21 and 22, becomes predominant and increases speedily when the distance between the movable pointer and the contact-pieces is reduced; thus the plate 20 is brought rapidly between the contact-pieces 21 and 22.

Fig. 15 also illustrates a means for holding in position a movable pointer on a torsional wire or ribbon 7 inside the apparatus or instrumental with which said pointer is used. The cylindrical sections 25 and 26 inside which are housed small springs stretching the torsion wire 7 between them are interconnected by the parts 27 and 28 forming supporting members and including sections registering with the transverse section of the movable pointer 19, which sections are spaced to a considerable extent with reference to the rotary axis defined by the wire 7. Thus the maximum angle of rotation of the movable pointer may be larger than if the latter were mounted in the manner illustrated in Figs. 23 and 24 in which said angle of rotation is limited in amplitude by the rectilinear vertical uprights 44 standing in the path of the movable pointer.

In Figs. 16 and 17, a movable pointer is shown in which the end 29 of the extension 10 of the transverse blade 9 is folded at right angles so as to allow an easy detection through the feeler 30. It will be readily ascertained that said feeler 30 which assumes a detecting movement in the direction of the arrow can only execute its movement when the abutment end 29 on the blade 9—10 has passed beyond one of the lateral ends of said feeler.

In Fig. 18, the movable pointer is similar to that of Fig. 16, but it is provided with an auxiliary abutment blade 31 extending to either side of the extension 29 and welded transversely to the latter. Said auxiliary transverse blade 31 allows for a same amplitude of operation using a detecting feeler 30 having a reduced breadth as illustrated.

In Fig. 19, the movable pointer illustrated is similar to that shown in Fig. 16, except for the fact that the abutment blade extension 29 is shifted downwardly through a second fold at 32. Thus the detecting head of the feeler is also in a lower location so as to reduce the space required and to further the use of a miniature shaped member 19 in overhanging relationship to either side of a torsion wire or ribbon 7. For balancing the whole arrangement, I provide a second extension 10 opposed to the extension 32—29. This balancing extension 10 illustrated in Fig. 19 is advantageously folded at its end in accordance with my invention so as to allow through its deformation the easy obtention of an accurate balancing of the movable pointer.

Figs. 20 and 21 show a movable pointer which is also intended for the detection through a feeler 30 with the modification constituted by the provision of two angularly spaced abutment blade extensions 29 and 29. To this end, a further extension is welded to the first extension 10 as illustrated at 32. The cross-member 33 appearing more clearly in Fig. 21 serves for maintaining the spacing between two abutment blade extensions to a constant value.

I have not illustrated in Figs. 16 to 21 the bearing member associated with the feelers 30 and against which said feelers urge the abutment blades 29 and 31 when moving in the direction of the arrow.

It will be readily ascertained that this detection of the movement of a movable pointer may be executed optically and more particularly through photocells instead of mechanically. In this case, the abutment may be constituted directly by the miniature shaped member 19 or else a feeler may be used for detecting directly the location of the miniature shaped member, provided the corresponding section of the latter is reinforced.

Obviously an extension 10 of the transverse securing blade 9 for a movable pointer may serve directly for establishing an electric connection between contact-pieces for predetermined locations of the movable pointer. The shorter said extension, the more lenient will be the requirements of protection of the live contact-pieces with reference to the movable pointer. Thus, the pointers illustrated in Figs. 16 to 21 may also serve in arrangements producing electric contacts. To this end, it is preferable to fold the operative parts illustrated at 10 perpendicularly to the direction of movement.

Obviously, the blades forming an intermediate securing member and the extensions of the latter may be cut and assume shapes differing more or less from the rectangular shape illustrated in the accompanying drawings.

In Fig. 22 is shown a fine ribbon or wire 7 carrying a movable pointer 19 and secured at each end to crossed springs constituted by two blade springs 34 and 35. It will be remarked that the blades 34 extend nearer the actual pointer 19 while the blade 35 projects beyond the point of crossing of the springs. In a preferred embodiment of my invention, the ends of the fine wire or ribbon 7 extend each inside the angle formed by the two edges of the blades 34 and 35 over the inner blade 34 and along the edge of the outer blade 35 so as to be finally folded round the inner blade 34 and wedged between the inner surface of said inner blade 34 and a small blade 36 welded to either side of the fine wire or ribbon 7 to the said inner blade 34. It will be readily ascertained that the outer blades 35 protect the ends of the wire 7 at the points where they pass over the tensioning springs 34 and 35. The parts in which the wire is folded over the ridge of the inner blade 34 may be flattened in the case of a round wire or else said ridge may be rounded; said ridge may also be notched so as to hold the wire in said notch against transverse shifting.

I have also illustrated in Fig. 22 points 37 formed through a suitable cutting and folding of the ends of the spring blades 34 and 35.

Fig. 23 shows the two halves 38 and 39 of a preferred carrier for the miniature dynamometric system illustrated in Fig. 22. The two annular steps 40 form bearings for the tips or points 37 of the wire-stretching blade springs. It is readily apparent that the wire 7 is then located axially of the superposed inner spaces 41 formed between said two halves, the miniature shaped member extending through the openings 42 cut across said halves while the intermediate securing member or blade 8 is positioned inside the cylindrical channel 43 between the two inner spaces 41. According to a preferred embodiment of my invention, the diameter of said recess 43 is slightly larger than the breadth of the securing member 8 and this has for its object to limit the possible transverse shifting of the movable pointer and consequently to reduce the straining of the wire 7 to a minimum when the instrument incorporating the movable pointer carried by the carrier shown in Fig. 23 is subjected to shocks or vibrations. A limitation of the height of the openings 42 may also serve for limiting the longitudinal possible shifting of the movable pointer, chiefly when the latter is to act through a blade such as 10. In the case of a movable pointer, the intermediate securing member of which is constituted solely by two longitudinal blades 8 and 8, it is preferable in contradistinction to provide stops for limiting the longitudinal shifting of the movable pointer, said stops acting on the smaller sides of said blades not being illustrated in Fig. 23. In order to improve the damping action of the surfaces at 42 and 43, it is preferable to provide them with a very soft elastic coat even if the remainder of the carrier is constituted by an elastic material such as semihard rubber for instance.

Fig. 23 also shows that each half-carrier 38 or 39 is provided with an upright 44 connecting the upper and lower sections of the corresponding half-carrier. These uprights 44 limit the breadth of the transverse openings 42 provided for the movable pointer so as to reduce the amplitude of deflection thereof. Obviously and as shown in Fig. 15, it is possible to increase this amplitude as mentioned hereinabove by substituting for the uprights 44 arcuate connecting members 27 and 28.

Fig. 23 also shows projections 45 on each half-carrier for cooperation with corresponding recesses 46 in the other half-carrier and these recesses provide an easy and immediate inter-engagement between the operative surfaces of said half-carrier. The arrangement may be finished by gluing or welding or else by split rings surrounding the cylindrical surfaces of the carriers which are provided with annular grooves for this purpose. It may also be sufficient to insert a carrier in circular recesses provided in the instrument for which the movable pointer is intended.

Turning to Fig. 24, showing a half-carrier slightly different from those illustrated in Fig. 23, the upright 44 connects two semi-cylindrical sections positioned to either side of a transverse medial plane respectively to the left hand side and to the right hand side of said upright 44. Thus the two halves of the carrier in the embodiment illustrated in Fig. 24 are interengaged so that their assembly is furthered. It should be remarked that the two corresponding carrier halves of the type illustrated in Fig. 23 or 24 are identical and may thus be obtained in the same mold.

As to Fig. 25, showing a carrier similar to that of Fig. 23 intended for a pointer of the type illustrated in Fig. 16 for instance, it will be remarked that each of the two openings 42—42 is limited by a single upright 44—44. Thus, the amplitude of deflection may readily extend beyond 180°.

Lastly, Fig. 26 shows a carrier which does not limit at all the amplitude of deflection of the movable pointer. It is constituted by two cylindrical members 46 and 47 provided each with a recess and with a circular groove 48, said groove 48 being engaged by the ends of a strap 49. Each of said cylindrical members 46 and 47 is provided furthermore with a recess for the corresponding system of stretching blade springs 34 and 35 similar to those described with reference to Fig. 22 but devoid of any claws or points 37. Said recesses are located in a manner such that the fine wire or ribbon 7 lies accurately along the axis of each of the cylindrical members 46 and 47. The rotation of the latter allows thus modifying as desired the location of the movable pointer; a tubular extension 50 of one of the recessed cylindrical members 48 contains the cushion forming the channel 43 or clearance in a manner similar to the embodiment illustrated in Figs. 23 to 25. Obviously, it is also possible to limit the longitudinal movements of the pointer.

Of course, my invention is by no means limited to the embodiments described and illustrated and many modifications thereof may be imagined within the scope of the accompanying claims.

What I claim is:

1. In a suspension for a combined electrometer pointer and movable electrode comprising a very thin suspension wire, a narrow elongated hollow pointer device, said pointer device being formed from a single plane sheet of metal into a hollow body of triangular cross section with the edges of the sheet projecting inwardly of the hollow body, a first narrow strip carrying the pointer device and extending longitudinally along a section of the wire on one side thereof, at least one further narrow strip extending along said wire section on the side opposed to that facing the first strip, said strips having concave surfaces facing each other, the upper and lower inner edges of said strips having protrusions which extend inwardly transversely of the wire axis and engage corresponding sides of the wire, and the axially extending side edge portions of said strips contacting each other and being welded at the outermost edge.

2. In a suspension according to claim 1 in which the entire axially extending side edge portions are welded.

3. In a suspension according to claim 1 in which said further narrow strip comprises spaced transverse blades which extend along said wire section on the side opposed to that facing the first strip.

4. In a suspension according to claim 1 in which said strips have extensions extending longitudinally along and spaced from said wire.

5. In a suspension according to claim 1 in which said further narrow strip comprises spaced transverse blades which extend along said wire section on the side opposed to that facing the first strip, one of said blades including extensions extending away from said wire.

References Cited in the file of this patent

UNITED STATES PATENTS

| 1,551,374 | Davey | Aug. 25, 1925 |
| 1,982,333 | Thomander | Nov. 27, 1934 |
| 1,996,901 | Burns | Apr. 9, 1935 |
| 2,213,853 | Whitehead | Sept. 3, 1940 |
| 2,562,183 | Greibach | July 31, 1951 |
| 2,580,815 | Mooney | Jan. 1, 1952 |

FOREIGN PATENTS

| 1,082,666 | France | June 23, 1954 |
| 1,082,667 | France | June 23, 1954 |